United States Patent
Ocedek et al.

(10) Patent No.: US 9,915,311 B2
(45) Date of Patent: Mar. 13, 2018

(54) TWO PIECE TORQUE LIMITING CLUTCH BRAKE

(71) Applicant: Eaton Corporation, Cleveland, OH (US)

(72) Inventors: Christopher M. Ocedek, Auburn, IN (US); Bradly E. Hiatt, New Haven, IN (US); Deevakar Kuppuswamy, Kolkata (IN); Bhanu Sharma, Kolkata (IN)

(73) Assignee: Eaton Corporation, Cleveland, OH (US)

( * ) Notice: Subject to any disclaimer, the term of this patent is extended or adjusted under 35 U.S.C. 154(b) by 629 days.

(21) Appl. No.: 14/274,345

(22) Filed: May 9, 2014

(65) Prior Publication Data

US 2014/0332334 A1    Nov. 13, 2014

Related U.S. Application Data

(60) Provisional application No. 61/821,784, filed on May 10, 2013.

(51) Int. Cl.
| | |
|---|---|
| *F16D 67/02* | (2006.01) |
| *F16D 7/02* | (2006.01) |
| *F16D 65/12* | (2006.01) |
| *F16D 65/02* | (2006.01) |
| *F16D 69/04* | (2006.01) |

(52) U.S. Cl.
CPC ........... *F16D 67/02* (2013.01); *F16D 65/123* (2013.01); *F16D 7/025* (2013.01); *F16D 2065/1312* (2013.01); *F16D 2069/0425* (2013.01); *F16D 2069/0433* (2013.01)

(58) Field of Classification Search
CPC ............. F16D 67/02; F16D 2069/0425; F16D 2069/0433; F16D 7/025; F16D 65/12; F16D 2065/1312; F16D 65/123
USPC ......... 192/13 R, DIG. 1, 109 A; 188/218 XL
See application file for complete search history.

(56) References Cited

U.S. PATENT DOCUMENTS

| | | | | |
|---|---|---|---|---|
| 3,763,977 A | * | 10/1973 | Sink ........................ | F16D 67/02 188/71.2 |
| 4,657,124 A | * | 4/1987 | Flotow .................... | F16D 67/02 192/107 C |
| 4,807,730 A | * | 2/1989 | Kitano .................... | F16D 65/12 192/107 C |
| 4,947,969 A | * | 8/1990 | Tarlton, Sr. ............. | F16D 65/12 188/218 XL |
| 5,031,739 A | * | 7/1991 | Flotow ................... | F16D 65/123 192/13 R |
| 5,099,970 A | * | 3/1992 | Harris ..................... | F16D 67/02 192/13 R |
| 5,415,256 A | * | 5/1995 | Weigand ................. | F16D 65/12 192/13 R |
| 6,450,310 B1 | * | 9/2002 | Catrinta .................. | F16D 67/02 192/13 R |
| 8,646,586 B2 | | 2/2014 | Catrinta | |

* cited by examiner

*Primary Examiner* — Terry C Chau
(74) *Attorney, Agent, or Firm* — Ernest E. Helms

(57) ABSTRACT

A torque-limiting a clutch brake is provided for an input shaft of a vehicle transmission. The clutch brake employs wave springs in its torque-limiting feature and can largely be fabricated from sheet metal parts.

25 Claims, 8 Drawing Sheets

TWO PIECE TORQUE LIMITING CLUTCH BRAKE

CROSS-REFERENCE TO RELATED APPLICATIONS

This application claims the benefit of U.S. Provisional Application No. 61/821,784, filed May 10, 2013.

FIELD OF THE INVENTION

The present invention relates to clutch brakes for transmissions.

BACKGROUND OF THE INVENTION

Clutch brakes are use to stop rotation of a transmission input shaft in constant mesh transmissions. The clutch brake in an annular member that is torsionally connected on an input shaft of a transmission via a grooved connection. The clutch brake is also axially slidable on the transmission input due to the grooved connection. Most clutch brakes are placed on the transmission input shaft between a release assembly that includes a release bearing and housing and front part of a transmission frame inside of a transmission bell housing. When a transmission gear shift is mandated, a shift fork will pull back the release bearing housing forcing the frame of the release bearing housing against a front frictional lining of the clutch brake. The back of the clutch break has a frictional lining that engages with the frame of the transmission adjacent the transmission input shaft. Pulling back on the release housings bearing disconnects the clutch assembly which connects the transmission to the engine and additionally causes the clutch brake (which is torsionally connected to the transmission input shaft) to cause the transmission input shaft to stop rotating. Clutch brakes typically wear out faster than clutches and have to be replaced. Removal is difficult since access to the clutch brake is only through an inspection port of the transmission bell housing unless one pulls out the transmission from the vehicle's engine. Typically the clutch brake is torn off the transmission input shaft. It is desirable to provide a clutch brake that can be removed from a transmission shaft without the required tear off. It is also desirable to provide such a clutch brake that has a torque limiter function. It is also desirable to provide a clutch brake that has a hinged connection, has a torque limiter, can be mainly fabricated from stamped sheet metal parts and that can have as few as parts as possible.

SUMMARY OF THE INVENTION

To fulfill the above noted and other manifold desires, a revelation of the present invention is brought forth. In a preferred embodiment, the present invention brings forth a torque-limited two part hinged clutch brake for a transmission input shaft. The clutch brake has first and second arcuate shells which are hinged together. Encased within the arcuate shells are first and second inner collars which have a tab for interconnection with an axial groove in the transmission input shaft. Circumferentially interconnected with the inner collars and positioned radially outward of the inner collars are outer collars. Wave springs are provided which have a position fixed with respect to the arcuate shells for urging the outer collars against an opposite interior wall of the arcuate shells. A weld nut is provided connected to one of the shells which is overlapped by an eyelet formed on the opposite shell to allow for permanent installation of the clutch brake by insertion of a threaded fastener.

Other advantages of the present invention will become more fully apparent from a review of the invention as it is provided in the detailed description.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
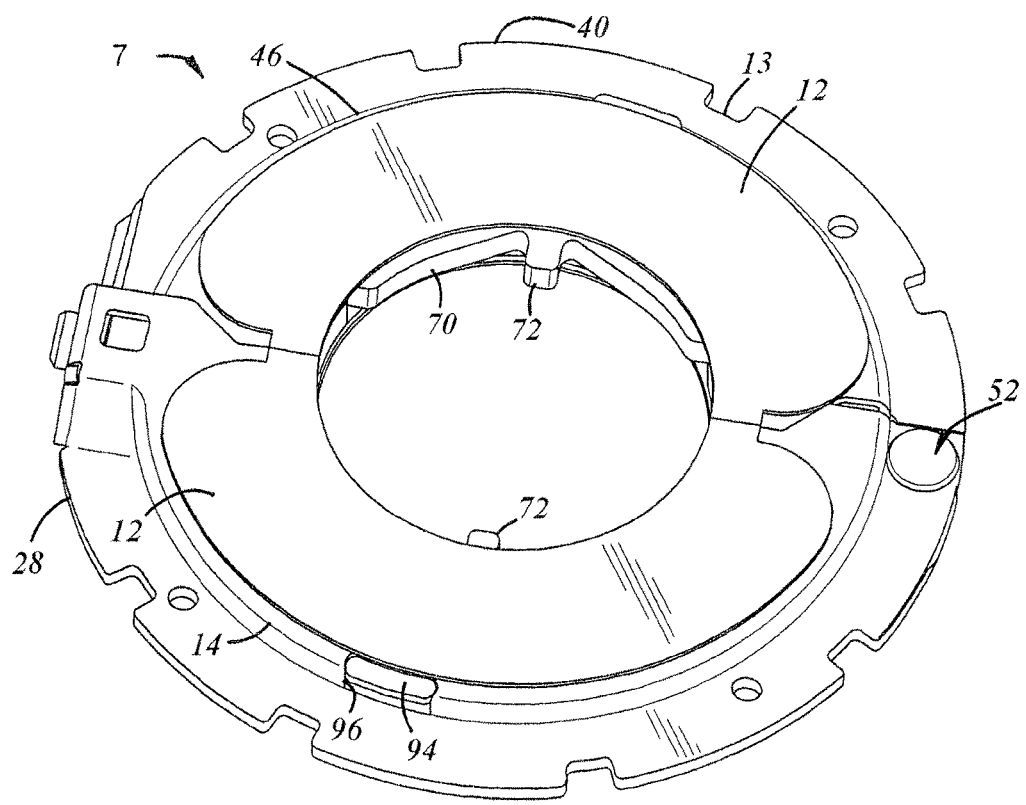
FIG. 1 is a perspective view of a clutch brake according to the present invention.
Figure 2:
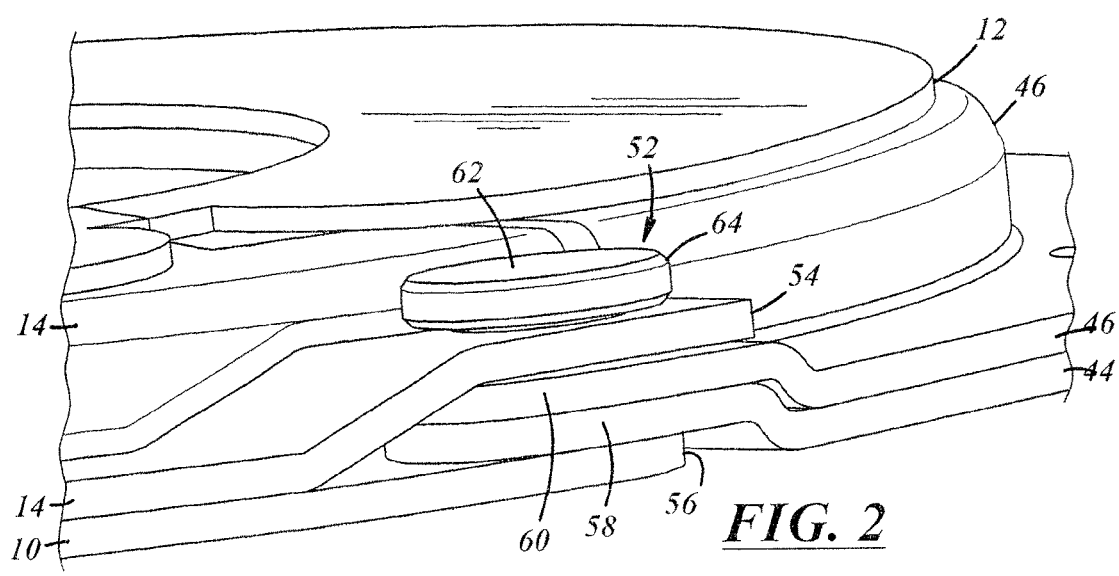
FIG. 2 is an enlarged perspective view of a hinged portion of the clutch brake shown in FIG. 1.
Figure 3:
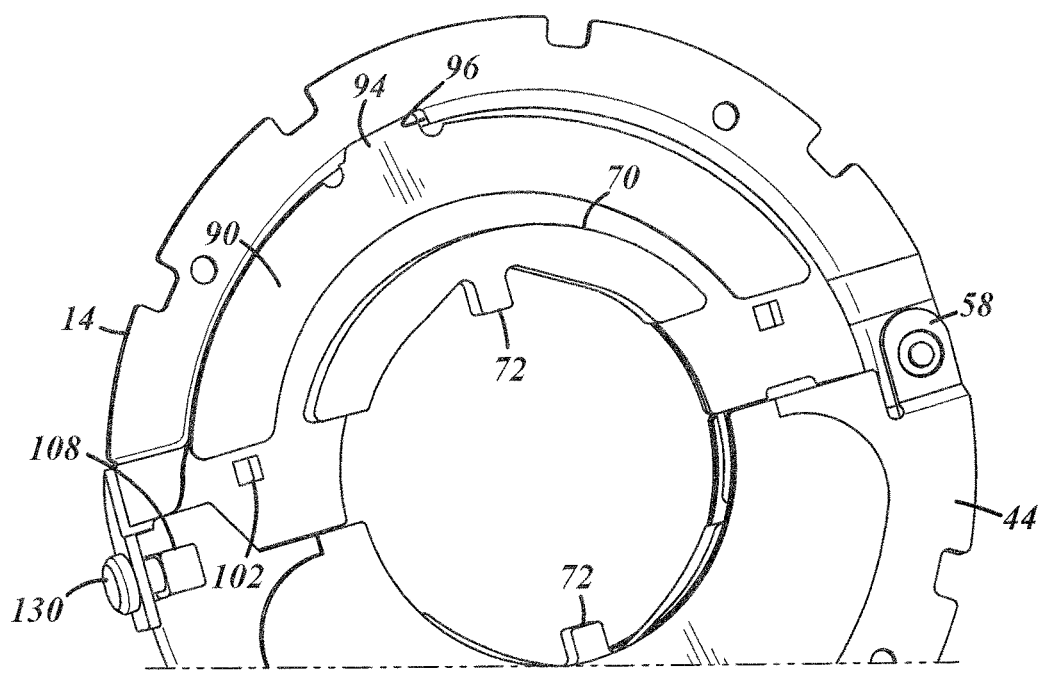
FIG. 3 is a perspective view of the clutch brake shown in FIG. 1 with the first rear backer plate being removed for clarify of illustration.
Figure 4:
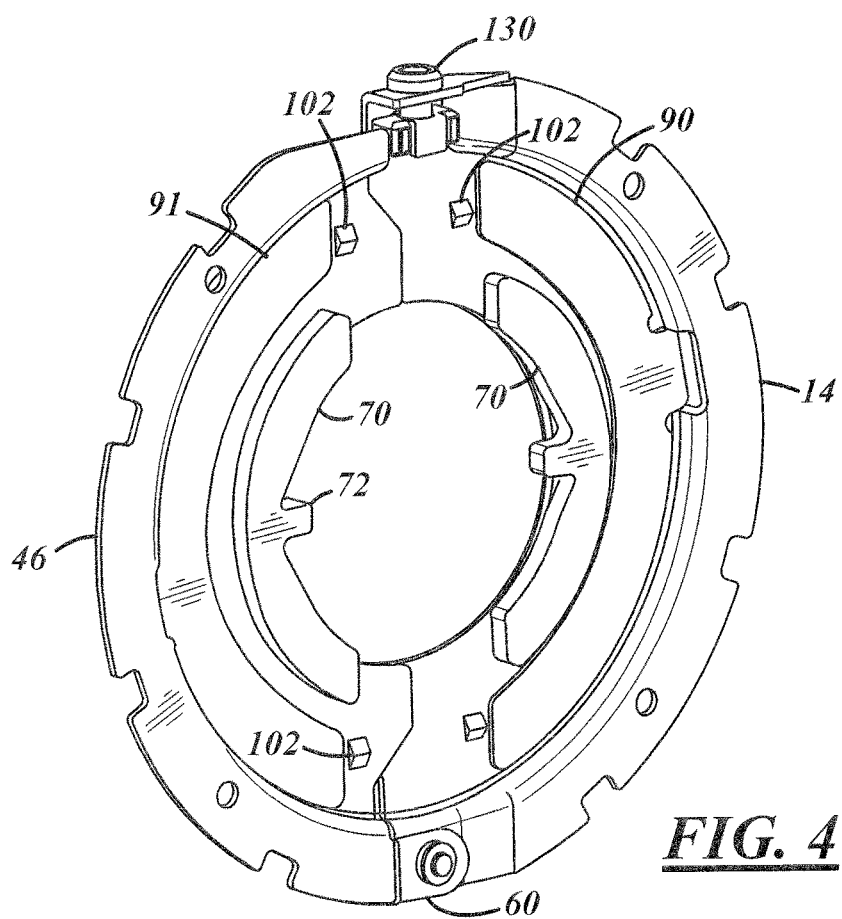
FIG. 4 is a perspective view of the clutch brake shown in FIG. 3 with both of the rear backer plates being removed for clarity of illustration.
Figure 5:
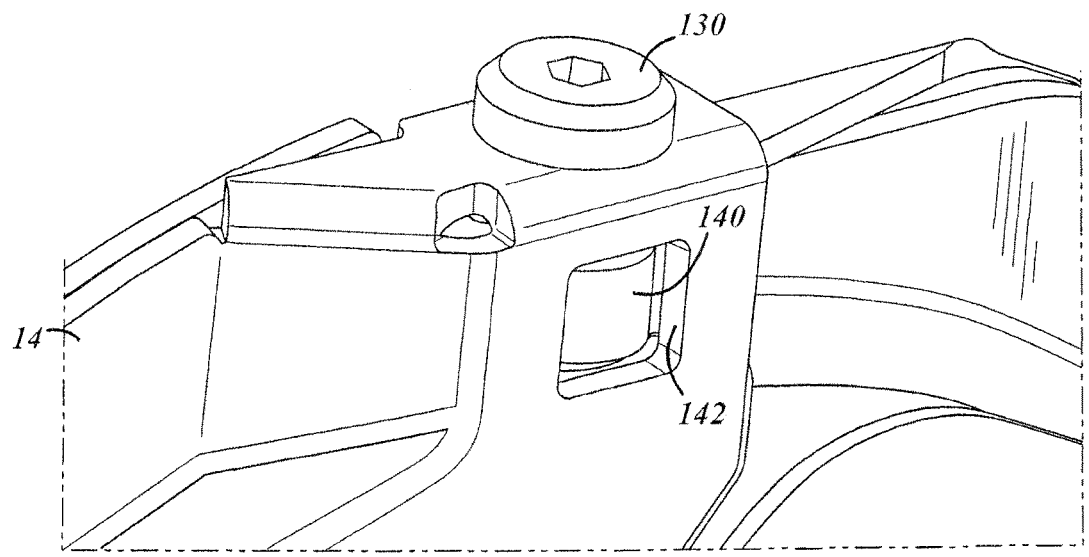
FIG. 5 is a perspective view illustrating a detent function of a weld nut which holds first and second arcuate shells of the clutch brake together.

The following description of the preferred embodiment(s) is merely exemplary in nature and is in no way intended to limit the invention, its application, or uses.

Referring to FIGS. 1 through 14, a clutch brake 7 according to the present invention is provided. Clutch brake 7 has a rear backer plate 10. As used in this application the direction rear means towards the transmission, the designation front means towards the engine end of a transmission input shaft. The first rear backer plate 10 is typically fabricated from a stamped sheet metal. Typical materials for the first rear backer plate will be that of a low carbon steel. Bonded to the first rear backer plate 10 or otherwise connected is a friction lining 12.

Weldably connected to the first rear backer plate 10 is a first front backer plate 14. The material of the first front backer plate is typically similar or identical to the material of the first rear backer plate 10. The first front backer plate 14 has a flat radial flange portion 16. The flat radial flange portion 16 of the first backer plate is connected with an axially extending portion 18. The first front backer place axially extending portion 18 is connected with a generally radial friction lining support portion 20. The rear backer plate has a radially extending flat flange portion 22 which is adjacent to the flange portion 16 of the first backer plate. The rear backer plate has a lining support portion 24 for supporting the lining 12. The linings for the front backer plate 14 and the rear backer plate 10 are typically essentially identical.

At an intersection of the rear backer plate flange portion and the front backer plate flange portion 16, and the front backer plate axially extending portion 18, there is a continuous weld seam 26 to hold the first rear backer plate front rear backer plate together. A weld seam 27 can also be provided in the flange portion of the backer plates. Some embodiments with the weld seam 27 will omit the weld seam 26. The first rear backer plate 14 and the front backer plate when welded together form an arcuate first shell 28 providing an arcuate clam shell shaped chamber.

Clutch brake 7 has a second arcuate shell 40. Second arcuate shell 40 has a rear backer plate 44 and a front backer plate 46. The second rear backer plate 44 and the front backer plate 46 typically are stamped from the same material as the first rear backer plate 10. Typically the second rear backer plate 44 and the second front backer plate 46 will be welded together as previously described with the first arcuate shell 28. Also, backer plate 44 and 46 also have friction linings 12 as previously described.

A hinge connection 52 is provided to pivotally connect the first and second arcuate shells 28 and 40 together. The first arcuate shell front backer plate has a hinge portion 54 axially spaced or separated from a rear backer plate hinge portion 56. A hinge portion 58 of the second rear backer plate and a hinge portion 60 of the second front backer plate are axially positioned adjacent to one another and are captured between the hinge portions 54 and 56 of the first arcuate shell. A hinge pin 62 is provided having a head 64 that abuts hinge portion 54. The hinge pin 62 has a shank 66 that extends through apertures in the hinge portions 54, 58 and 60. The pin shank 66 is weldably connected to hinge portion 56 of the first rear backer plate. A slight clearance is made in the axial stack-up of the hinge portions to allow for ease of pivotal movement between the arcuate shells 28 and 40.

Clutch brake 7 has first and second arcuate inner collars 70. Inner collars 70 have inwardly extending tabs 72. Tabs 72 are provided for interconnection with axial grooves provided in a transmission input shaft (not shown). Therefore the inner collars 70 turn with the transmission input shaft. The inner collars 70 outer periphery 74 is incased in the chambers provided by the arcuate shells 28 and 40. Clutch brake 7 has first and second outer collars (sometimes referred to as tang washers) 78. Outer collars 78 are positioned radially outward of the inner collars 74. The outer collars 78 have radially inward extending arms 82 which capture extreme ends 84 of the inner collars. The outer collars 78 circumferentially interconnect with the inner collars 74 so that the outer collars 78 and the inner collars 74 rotate together. The outer collars have tongue and groove 86, 88 to insure for proper alignment of the outer collars during assembly of the clutch brake 7. The outer collar 78 is axially thinner than the inner collar 70. The inner collar 70 has an axial thickness slightly less than an interior axial distance between the front and rear backer plates of the arcuate shells 28, 40.

The clutch plate 7 has wave springs 90 and 91. The wave spring 90 has two coplanar portions 92 that are 90° apart. The wave spring 90 has 1.6 undulations or waves. The wave spring 90 has a radially outward extending restraining tab 94 that fits within a slot 96 of the front backer plate to fix the spring's position with respect to the first front backer plate 14. The tab 94 is arcuately off-centered so as to prevent incorrect installment of the spring 90 with the backer plate 14 (upside down or on the wrong backer plate). A tab 95 on spring 91 is also off-center. The springs 90, 91 bias the outer collars 78 into an interior surface of the rear backer plates 10, 44.

The first front backer plate 14 has stamped protrusions 102. Stamped protrusions 102 contact ends 97 of the spring 90 (Note in FIG. 3 ends of the spring are not contacting the protrusions 102 for purposes of illustration). The protrusions insure the ends 97 of the spring do not engage with the outer collars 78.

Figure 6:
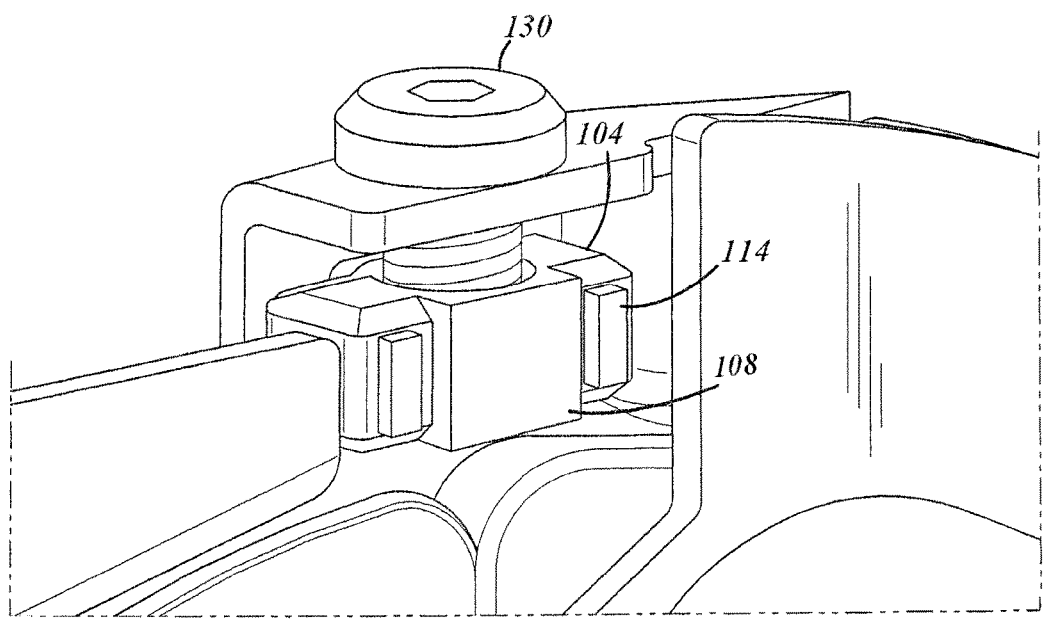
FIG. 6 is a view similar to that of FIG. 5 illustrating the opposite end of the weld nut than that shown in FIG. 5.
Figure 7:
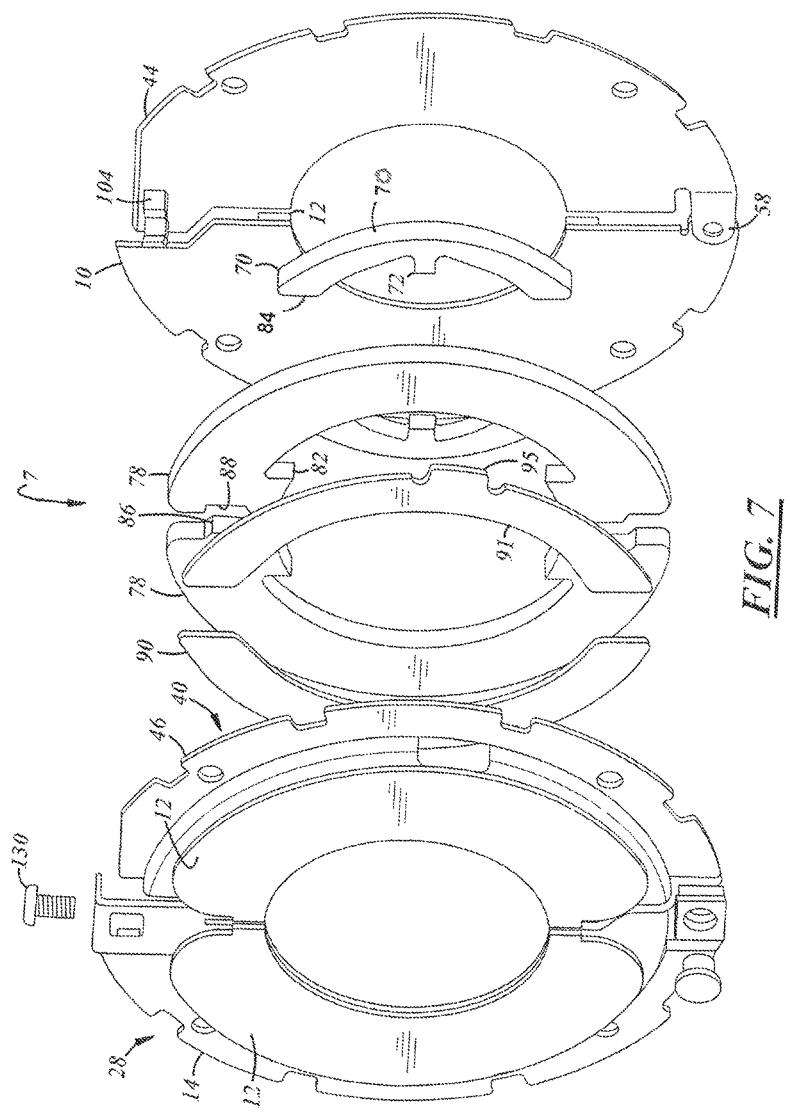
FIG. 7 is an exploded view of the major components of the clutch brake shown in FIG. 1.
Figure 8:
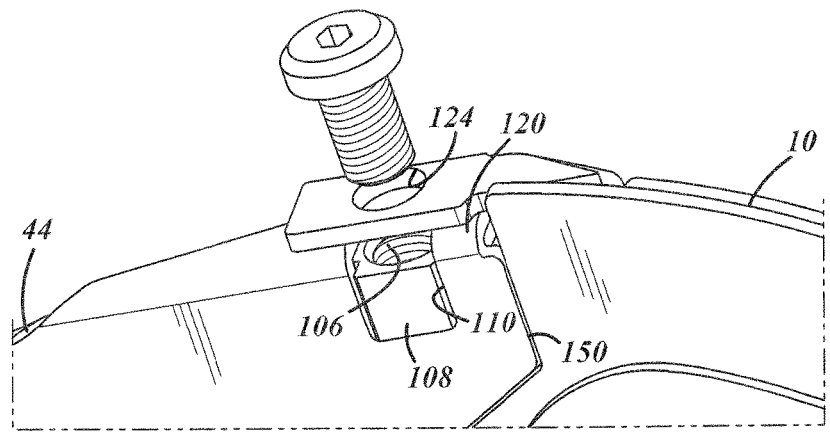
FIG. 8 is an enlarged perspective view illustrating the connection of the weld nut tongue being fitted within a slot of the second rear backer plate of the clutch brake of the present invention.
Figure 9:
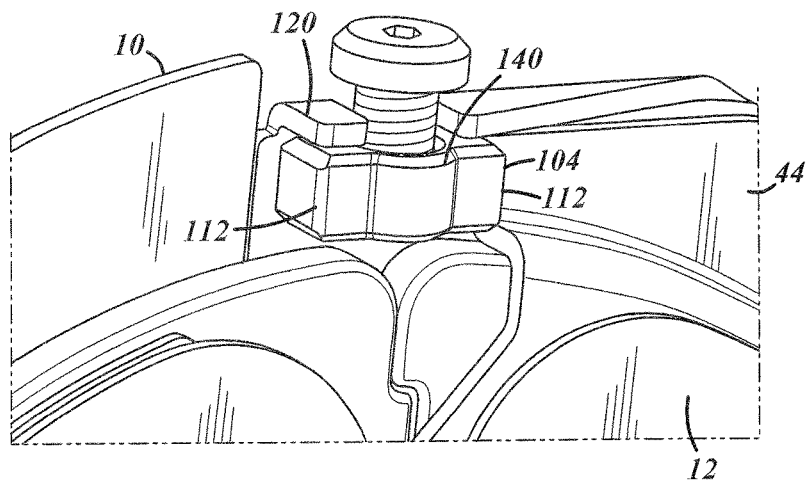
FIG. 9 is a view similar to that of FIG. 9 illustrating the weld not from the opposite view point showing the mound region of the weld nut with the first and second front backer plates being removed for clarity of illustration.
Figure 10:
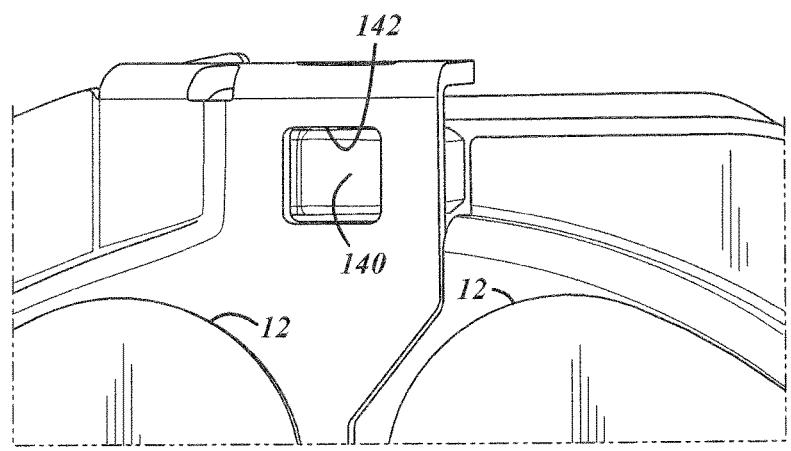
FIG. 10 is a view similar to that of FIG. 5 illustrating the detent function of the weld nut.
Figure 11:
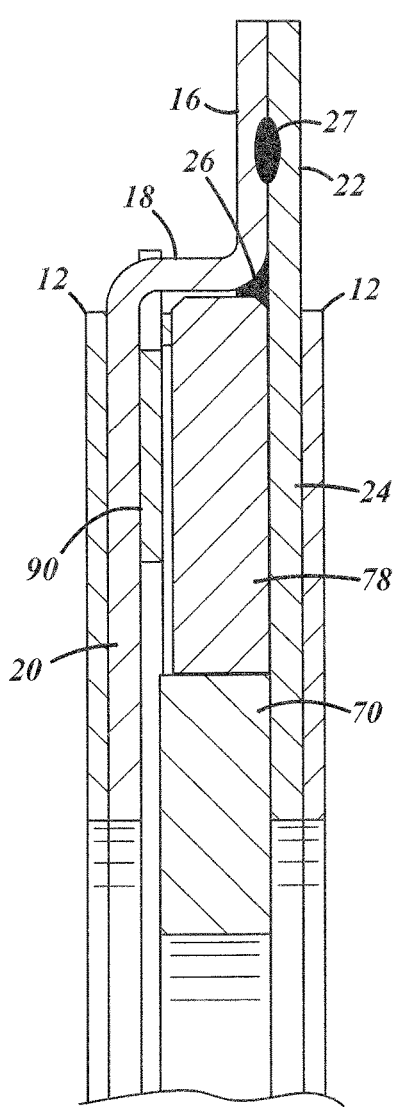
FIG. 11 is a sectional view along an outer flange area of the clutch brake of the present invention.
Figure 12:
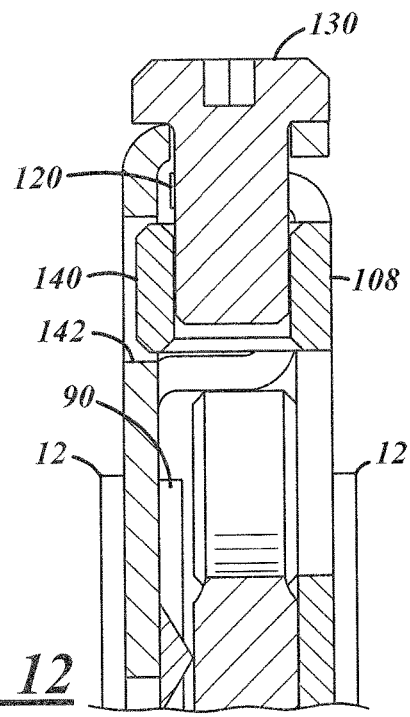
FIG. 12 is a sectional view of the clutch brake of the present invention taken through the weld nut of the present invention.
Figure 13:
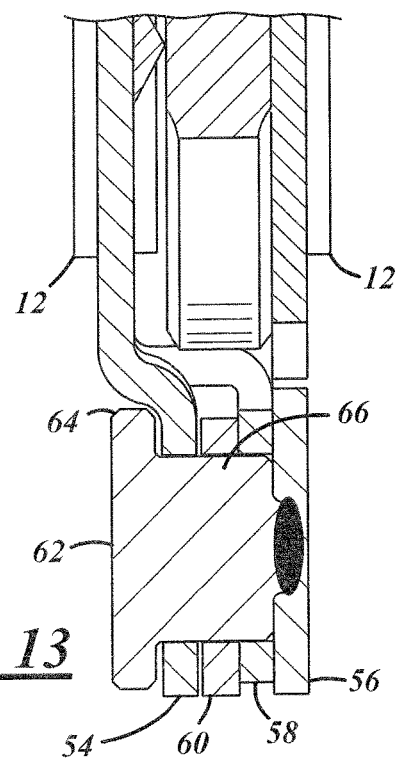
FIG. 13 is a sectional view taken along the hinge portion of the present invention.
Figure 14:
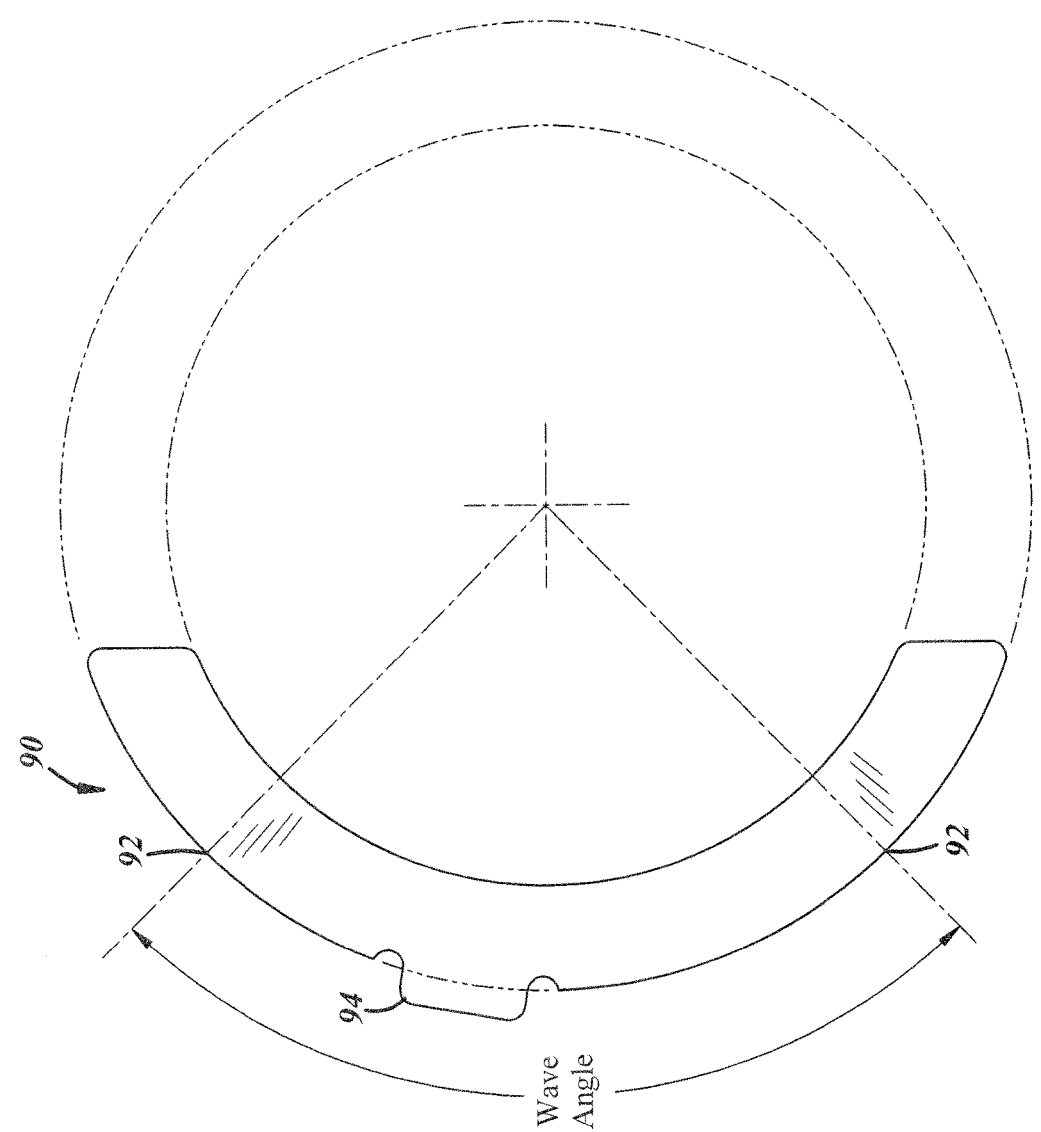
FIG. 14 is a plan view of the wave spring of the present invention.
Figure 15:
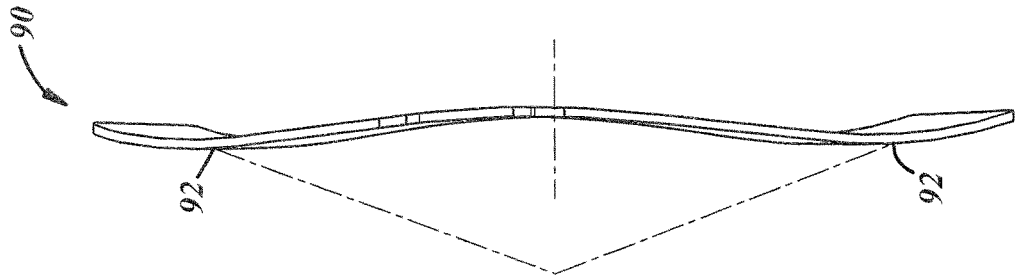
FIG. 15 is a side elevational view of the wave spring shown in FIG. 15.

To hold the arcuate shells 28, 40 together there is provided a weld nut 104. The weld nut 104 has a threaded aperture 106 that is orientated normal to a central axis of the clutch brake 7. The weld nut 104 has a tongue 108 fitted within a slot 110 that is in the second rear backer plate 44 generally opposite the hinge connection 50. The weld nut 104 has a main body with lateral extensions 112. A portion of the lateral extensions 112 is welded to the rear backer plate generally lateral of the tongue 108. FIG. 6 illustrates the weld beads 114 that connect the weld nut 104 to the second rear backer plate 44. The second rear backer plate 44 also has a bent arm 120 which further secures the weld nut 104. Aligned with the threaded aperture 106 is an eyelet 124 provided by the first front backer plate 14. The eyelet 124 accepts a headed threaded fastener 130 which connects the arcuate shells 28 and 40 together. Opposite the tongue 108, the weld nut has a mound protrusion 140. The mound protrusion 140 can be accepted by an opening 142 provided in the first front backer plate 14. The opening 142 has a snap fit relationship with the mound 140 providing a detent to keep the arcuate shells 28, 40 together until the threaded fastener 130 is installed for permanent installation. As best shown in FIG. 8 when the arcuate shells are placed together there exists a gap 150 between the two front backer plates 14 and 46.

In operation the arcuate shells 28 and 40 are opened, placed upon the transmission shaft so that the tabs 72 are connected with the axial grooves of the transmission shaft. The shells are closed, the detent mechanism holds the shells closed until the fastener 130 is installed into the weld nut threaded aperture 106. If in operation excessive torque in placed on the clutch brake the inner and outer collars 70 and 78 will rotate with respect to the arcuate shells 28 and 40 to limit the torque. If it is desired to change the level of limitation of the torque on the clutch brake 7, a substitution of springs with a different spring constant can be made. An advantage of the wave spring is that it allows the clutch brake to be thinner than clutch brakes with coil springs. Additionally, notches 13 are provided so that a chisel or other instrument which is inserted through an inspection port of the bell housing can rotate the arcuate shells 28 and 40 with respect to the inner and outer collars or to move the weld nut to a position best suited for removal.

Figure 16:
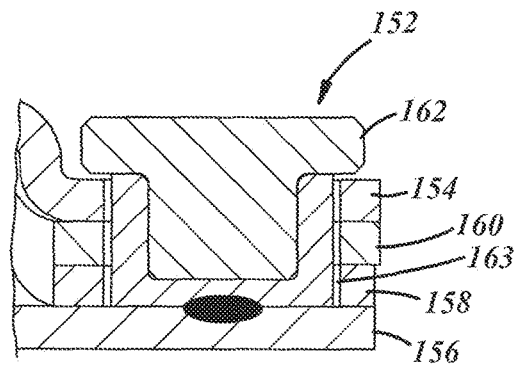
FIGS. 16 through 20 are sectional views similar to that of FIG. 14 of alternate preferred embodiment hinge portions of the present invention.

FIGS. 16 through 20 provide alternate preferred embodiments of the hinge portion of the clutch brake. Referring to FIG. 16 a hinged connection 152 has a hollow rivet 163 with its base welded to a hinge portion 156 of the first rear backer plate. Hinge portion 158 of the second rear backer plate and hinge portion 160 of the second front backer plate have a clearance with the side of the hollow rivet 163. A hinge portion 154 of the first front backer plate axially captures the hinge portions 158, 160 of the second rear and front backer plates. The hinge portion 154 also has a slight clearance with the head of the pin 162. A shank of the pin 162 is press fitted within the interior of the hollow rivet 163.

Figure 17:
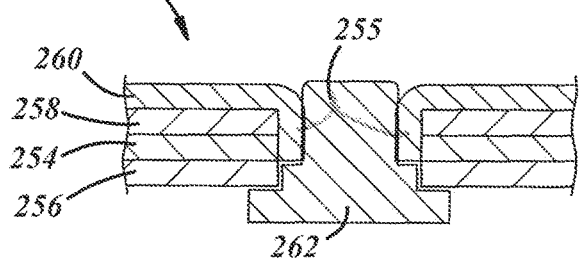

Referring to FIG. 17 a hinge connection 252 is provided. In hinge connection 252 a second rear backer plate hinge portion 260 has a deep draw leg 255. Leg 255 is press fitted about pin 262. Second front backer plate hinge portion 258 has a hinge portion with an enlarged aperture to accommodate the leg 255. A first backer plate rear portion 254 has radial clearance with the leg 255 as well as a first front backer plate hinge portion 256 which additionally has radial clearance with a step portion of the pin 262 as well as axial clearance with the head of the pin 262.

Figure 18:
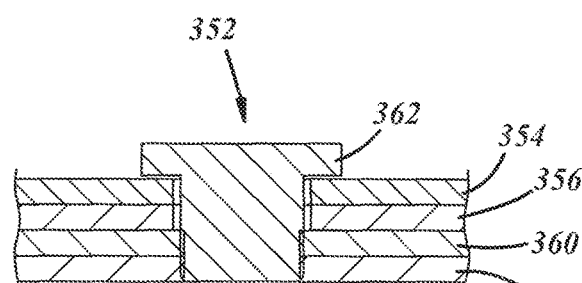

Referring to FIG. 18, hinge connection 352 is provided having a pin 362. Pin 362 is press fitted within the apertures of the second rear backer plate hinge portion 358 and of the second front backer plate hinge portion 360. Hinge portions 356, 354 of the first rear and front backer plate hinge portions respectively have apertures with a clearance with the pin 362. Hinge portion 354 has a clearance underneath the head of the pin 362.

Figure 19:
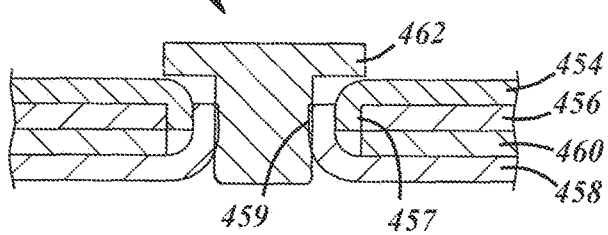

Referring to FIG. 19 hinge connection 452 is provided having a pin 462. A first front backer plate hinge portion 454 has a bent or drawn leg 457. A first rear backer plate hinge portion 456 has an enlarged aperture to accommodate the leg 457. A second rear backer plate hinge portion 458 has a upturned leg 459 which is press fitted with the pin 462 and also has a radial clearance with the leg 457. A second front backer plate hinge portion 460 has an enlarged aperture to accommodate the leg 459. The head of the pin has a slight clearance with the hinge portion 454 of the first front backer plate.

Figure 20:
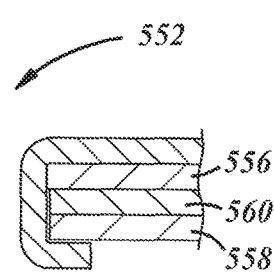

Referring to FIG. 20 hinge connection 552 is provided. Hinge connection 552 has a first front hinge portion 554 with a bend leg 555 with an outward extending flange 557 connected thereto. The flange 557 captures the first rear backer plate hinge portion 556 and has radial clearance and axial clearance with hinge portions 560, 558 of the second front and rear backer plates to allow pivotal movement.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque limited two-part hinged clutch brake for a transmission input shaft comprising:

first front and rear stamped metal backer plates forming a first arcuate shell, said first arcuate shell having frictional linings on outer front and rear surfaces;

second front and rear stamped metal backer plates forming a second arcuate shell hinge connected to said first arcuate shell, said second arcuate shell having frictional linings on second outer front and second rear surfaces;

first and second arcuate inner collars, said inner collars having a radially inwardly extending tab for interconnection with an axial groove in a transmission input shaft, said inner collars having an outer periphery encased within said first and second arcuate shells;

first and second outer collars circumferentially interconnected with said first and second inner collars positioned radially outward of said inner collars;

first and second wave springs each fixed to a respective internal side of one of said front and rear backer plates of said arcuate shells, said wave springs urging said outer collars against said other of said front and rear backer plates internal sides; and a weld nut connected to one of said first and second arcuate shells generally opposite said hinge connection, said weld nut having a threaded aperture aligned with an overlapping eyelet formed in said other of said first and second arcuate shells for reception of a threaded fastener connected with said weld nut to connect said first and second arcuate shells together.

2. The clutch brake as described in claim 1 wherein said weld nut is connected to said second rear backer plate.

3. The clutch brake as described in claim 2, wherein said eyelet is formed by said first front backer plate.

4. The clutch brake as described in claim 1, wherein said respective backer plate of said arcuate shell connected to said nut has a slot and wherein said nut has a tongue fitted within said slot and wherein said nut is weld connected to said respective backer plate lateral of said slot.

5. A clutch brake as described in claim 4, wherein said weld nut is welded at two locations with said respective backer plate.

6. The clutch brake as described in claim 1, wherein said nut threaded aperture is orientated normal to a central axis of said clutch brake.

7. The clutch brake as described in claim 1, wherein said weld nut has a mound protrusion and wherein said other of said arcuate shells has an opening forming a snap fit connection with said mound protrusion to act as a detent to keep said first and second arcuate shells closed upon a transmission shaft until said fastener is threaded in to said threaded aperture of said nut.

8. The clutch brake as described in claim 1, wherein, in said hinge connection between said arcuate shells, one of said first and second arcuate shells has axially separated front and rear backer plate hinge portions which capture axially adjacent front and rear backer plate hinge portions of said other of said first and second arcuate shell placed there between.

9. The clutch brake as described in claim 8, wherein said arcuate shells hinge connection includes a headed pin, said headed pin being adjacent to one of said front or rear backer plates of said one of said arcuate shells and said pin having a shank connected to said other one of said front and rear backer plates of one of said arcuate shells.

10. The clutch brake as described in claim 9, wherein said shank of said pin is connected to said other one of said front and rear backer plates of one of said arcuate shells via a hollow rivet welded to said other one of said front and rear arcuate plates of one of said arcuate shells.

11. The clutch brake as described in claim 1, wherein said front backer plates have outer radial flange portions and friction lining support portions joined by axially extending portions and wherein said rear backer plates have generally flat radially extending flange portions generally lateral to said front backer plates outer flange portions and wherein there are first continuous welds at intersections of said front backer plate outer radial flange portions and said rear backer plates and wherein there are second continuous welds at intersections of the front backer plate axially extending portions and said rear backer plates to form said arcuate shells.

12. The clutch brake as described in claim 1, wherein said springs bias said outer collars rearwardly into interior surfaces of said rear backer plates.

13. The clutch brake as described in claim 1, wherein said outer collar is axially thinner that said inner collar.

14. The clutch brake as described in claim 1, wherein one of said wave springs has an outer tab fitted within a slot of said respective arcuate shell.

15. The clutch brake as described in claim 14, wherein said spring outer tab is not symmetrical with a line extending between said hinge connection and said weld nut of said clutch brake.

16. The clutch brake as described in claim 1, wherein one of said wave springs has restrained ends restrained by protrusions of one of said front and rear backer plates of one of said arcuate shells.

17. The clutch brake as described in claim 1, wherein there is a gap between said weld nut and said other backer plate laterally adjacent to said backer plate of one of said first and second arcuate shells to which said weld nut is connected with.

18. The clutch brake as described in claim 1, having notches in at least one said arcuate shells along an outer diameter.

19. The clutch brake as described in claim 1 wherein said first and second outer collars have a tongue and groove connection between themselves.

20. The clutch brake as described in claim 1, wherein at least one of said arcuate shells has a continuous weld along a flange portion between said front and rear backer plates.

21. The clutch brake as described in claim 1, wherein said hinge connection includes a pin press fit to the front and rear backer plate hinge connection of one of said arcuate shells and having radial clearance with the front and rear backer plates of the other said arcuate shells and having clearance with a head of said pin with said other arcuate shells.

22. The clutch brake as described in claim 1, wherein said one of said arcuate shells has the rear backer plate with an up-ended leg press fit with a pin, and said clutch brake having the other arcuate shell having a front backer plate hinge connection with a clearance with a head of said pin.

23. The clutch brake as described in claim 1 with the hinge connection, wherein one of said arcuate shells has the rear backer plate with a first up-ended leg having a press fit relationship with a shank of a pin, and wherein the front backer plate of said other arcuate shell has the hinge connection with a second up-ended leg having a clearance with said first up-ended leg.

24. The clutch brake as described in claim 1, wherein one of said arcuate shells has a leg with a radial flange capturing the hinge connection of the front and rear backer plates of the other said arcuate shell.

25. A torque-limited two part hinge clutch brake for a transmission input shaft comprising:
   first front and rear stamped metal backer plates forming a first arcuate shell, said first arcuate shell having frictional linings on outer front and rear surfaces;
   second front and rear stamped metal backer plates forming a second arcuate shell hinge connected to said first arcuate shell, said second arcuate shell having frictional linings on second outer front and second rear surfaces;
   first and second arcuate inner collars, said inner collars having a radially inwardly extending tab for inner connection with an axial groove in a transmission input shaft, said inner collars having an outer periphery encased within said first and second arcuate shells;
   first and second outer collars circumferentially inner connected with first and second inner collars and positioned radially outward of said inner collars;
   first and second wave springs fixed with respect to said front backer plates, said first and second wave springs having tabs projecting through slots in said front backer plates, said tabs being nonsymmetrical with one another, said wave springs urging said outer collars against said rear backer plates' internal sides; and
   a weld nut connected on one of said first and second arcuate shells generally opposite said hinge connection, said weld nut having a threaded aperture aligned with an overlapping eyelet formed in said other of said first and second arcuate shells for reception of a threaded fastener connected with said weld nut to connect said first and second arcuate shells together and said weld nut having a mound protrusion for capture within an opening provided in the same arcuate shell providing said eyelet to provide a detent which holds said arcuate shells together until permanent installation together by said threaded fastener.

\* \* \* \* \*